May 30, 1939.  A. P. BALL  2,160,637
TRIM PANEL ASSEMBLY
Filed Jan. 31, 1936  2 Sheets-Sheet 2
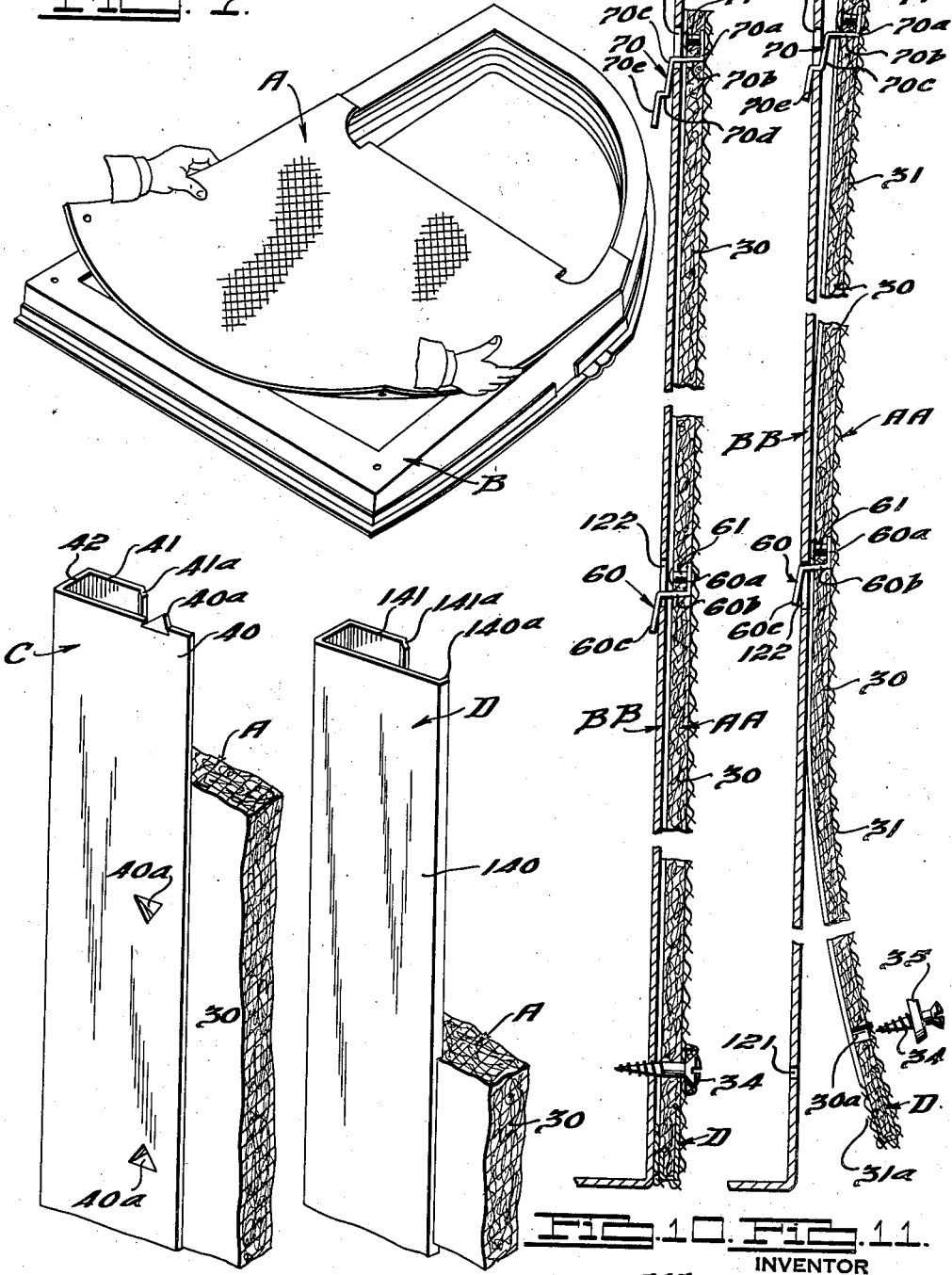

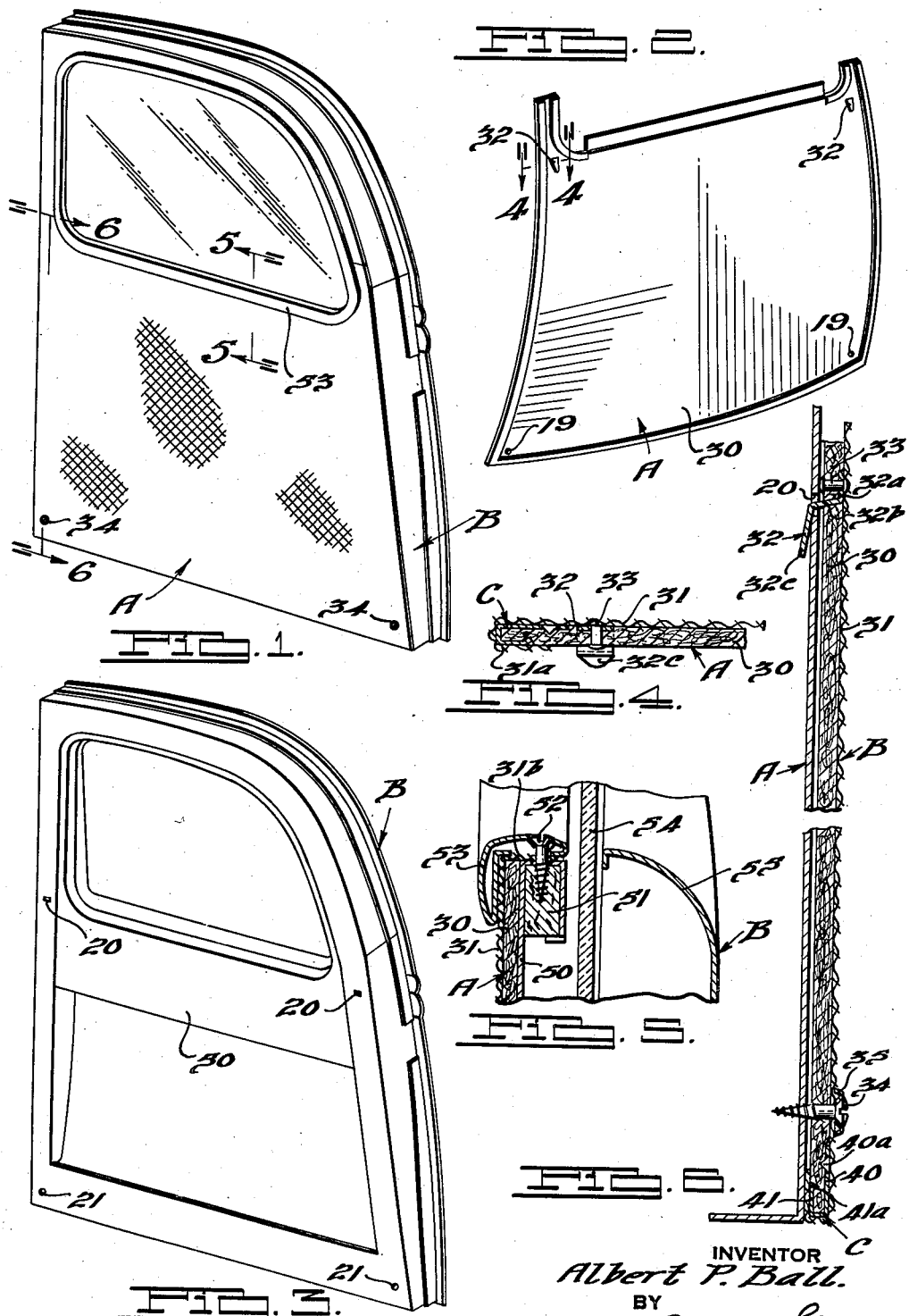

Patented May 30, 1939

2,160,637

UNITED STATES PATENT OFFICE 2,160,637

TRIM PANEL ASSEMBLY

Albert P. Ball, Detroit, Mich., assignor to Briggs Manufacturing Company, Detroit, Mich., a corporation of Michigan Application January 31, 1936, Serial No. 61,717

5 Claims. (Cl. 45—138)

This invention relates to trim panels or trim panel assemblies particularly adapted for use in the interior trim finish of automobile or other vehicle bodies, an object of the invention being to provide a new and improved interior trim panel, or trim panel assembly, and an improved method of forming, constructing and applying the trim portions of the body. This application is a continuation in part of my co-pending application Serial No. 50,331, filed November 18, 1935.

In conventional practice the interior body trim, including portions of the trimming for the doors, comprises panels usually composed of non-metallic backing sheets covered with the trim fabric, these panels being usually attached to the doors or other framing supports of the body by means of separate concealed snap fasteners. These fasteners are usually in the form of bent wire devices which must be anchored by hand in apertures in retainer plates or sockets located at the back of the trim panel and which, when the panel is mounted on the body, fasten into apertures in the latter. This mode of constructing and attaching the trim panels to the body framing has many disadvantages. Because of the large numbers of these fastener devices required for each body and the time, labor and expense necessary for their manufacture and installation, the use thereof in practice amounts to a substantial item of expense in the manufacture of automobile bodies.

An important object of the present invention is to eliminate these disadvantages, simplify and improve the construction of the trim panels, reduce the cost thereof, and provide improved and better means and method for fastening the trim panels to the doors and other frame portions of the body whereby substantial manufacturing economies are obtained while at the same time providing a more satisfactory, simple and efficient construction.

A further object of the invention is to provide a trim panel which may be composed of a relatively stiff backing sheet, either of non-metallic or metallic material, adapted to be covered with fabric or other trim material, and which panel is bent or otherwise preformed so as to be maintained normally in bowed condition, fastening means being provided whereby upon attaching or fastening the panel to the body support, the panel will be reversely bent and maintained under tension when mounted on the support.

Another object of the invention is to provide a trim panel of the foregoing character having certain of its marginal edges bound by means of spring metal strips to provide stiffness and rigidity without materially increasing the weight, said strips being held under tension when the panel is applied to the body, as the result of which the marginal edges of the panel will be firmly held under pressure against the surface of the body or support to which it is applied.

Other objects and advantages of this invention will appear from the following description and appended claims when taken in conjunction with the accompanying drawings forming a part of this specification.

In said drawings:

Fig. 1 is a perspective view looking toward the inside of a vehicle door carrying a trim panel embodying the present invention.

Fig. 2 is a perspective view looking at the inner face of the detached trim panel shown in Fig. 1.

Fig. 3 is a perspective view, similar to Fig. 1, with the trim panel removed.

Fig. 4 is a detail horizontal section taken substantially along the line 4—4 of Fig. 2, looking in the direction of the arrows.

Fig. 5 is a detail vertical section taken substantially along the line 5—5 of Fig. 1, looking in the direction of the arrows.

Fig. 6 is a detail vertical section, on an enlarged scale, taken substantially along the line 6—6 of Fig. 1, taken in the direction of the arrows.

Fig. 7 is a perspective view of the door of the preceding figures illustrating one mode of assembly of the trim panel shown in Fig. 2.

Fig. 8 is a fragmentary detail perspective view, on an enlarged scale, showing one form of edge binding for the trim panel.

Fig. 9 is a view similar to Fig. 8, showing another form of edge binding for the trim panel.

Fig. 10 is a detail vertical sectional view, on an enlarged scale, through a door and applied trim panel of modified form; and Fig. 11 is a view similar to Fig. 10 showing the parts partly assembled.

Before explaining in detail the present invention, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Referring particularly to Figs. 1 to 8 inclusive, there is herein illustrated, by way of example, a fabric covered trim panel A adapted to be releasably attached to the inner side of an automobile door B. In this instance the panel comprises a releasable stiff non-metallic backing sheet 30 of suitable material, such as fiber-board, the outer face of this sheet being covered with a suitable fabric or other trim material 31 folded around the edges of the backing or foundation sheet at 31a and cemented thereto. Mounted upon the backing sheet, preferably in the vicinity of the upper corners thereof, are fastener devices or members 32, secured to the backing sheet in any suitable manner, such as by means of rivets or the like 33. These fastener devices are preferably stamped out of sheet metal and each device has a portion 32a embedded in the face or outer surface, an angular portion 32b which projects through the foundation sheet and a downwardly bent inclined projecting portion or extension 32c located at the rear or inner face of the panel (see Figs. 2, 4 and 6).

Each of the panels 30 is provided preferably along three of its edges with a metallic binding C which serves to reinforce and stiffen the non-metallic foundation sheet. The binding C comprises two strips positioned along opposite side edges and a third strip extending along the bottom edge of the panel. These strips may be of spring steel and either before or after they are assembled on the backing sheet they may be pressed by means of suitable dies to impart to them a bowed or curved configuration. Thus the three spring metal binding strips maintain the side and bottom edges of the sheet in normally inward bowed condition in two directions, as best shown in Figs. 2 and 7. Each of the binder strips is formed preferably of sheet metal and is substantially channel shape in cross section, comprising a back section or portion 40, a front section or portion 41, and an interconnecting web or edge portion 42. The free end of the front portion is provided with an inturned flange 41a and the back portion with a series of spurts or tongues 40a struck inwardly from the material. The binding strip is slipped over the edge of the foundation sheet 30, and the flange 41a driven inward to embed it in the material of the sheet at one face thereof and the spurs 40a are forced into the material of the sheet at the other face thereof. The metal from which the binding strips are made is sufficiently stiff to cause the binder to grip the opposite faces of the sheet and compress the gripped portions thereof to cause the back portion 40 of the binder to lie substantially flush with the back face of the unbound portions of the sheet so that when the trim fabric 31 is folded around the edges of the bound sheet at 31a, there will be no obstruction or protruding portions caused by the metal binder.

As above described, the pre-bowed spring meal binding strips flex and correspondingly bow inwardly the edges of the foundation sheet, thus holding the sheet normally in bowed condition in both dimensions. That is to say, the panel is maintained normally in bowed condition both in the direction of its length and also of its width.

As shown in Figs. 3 and 6, the door frame is provided with a pair of slots or openings 20 adjacent the window reveal and with a pair of holes 21 in the vicinity of the lower corners of the door. The finished panel with its attached fasteners 32 is applied to the inner face of the door and the fasteners 32 inserted through the slots 20, this step being illustrated in Fig. 7. The panel is then forced downward to interlock the fasteners in the slots, the wedging action of the inclined portions 32c (Fig. 6) serving to draw the upper corners of the panel tightly against the door. The bottom portions of the trim panel are then flattened out by pressure of the hands and metal screws 34, the heads of which are seated in countersunk metal washers 35, are pushed through holes 19 in the panel and threaded into the registering holes 21 in the door frame. The panel is thus flattened out and flexed in the reverse direction from its normal bowed condition and conforms to the surface of the door or support to which it is applied.

After the panel has been applied to the inside of the door as above described, the upper free edge 31b of the trim fabric is turned over the central cross frame member 50, the upper end of which cross frame is substantially U-shaped in cross section and supports a tacking strip 51 of wood or other suitable material. The horizontal connecting flange of the frame member 50 is provided with spaced openings to receive screws 52 which serve to hold the garnish molding 53 in place, this molding in turn gripping the portion 31b of the trim fabric and holding it tightly against the frame member (see Fig. 5). In this figure the window glass is shown at 54 and, as usual, is capable of being raised and lowered into the window well located between the outer reveal 55 and the cross frame member 50.

Referring particularly to Fig. 9, there is shown in this figure a slightly modified form of binder, shown as a whole at D, this binder being similar to the binder C except as to the method of attaching it to the edge of the foundation sheet. The back portion 140 of each binding strip of this embodiment is provided with an angularly disposed flange 140a and the front portion 141 of each binding strip is provided with a similar inwardly disposed flange 141a corresponding to the flange 41a of the preceding form. After the strips are applied to the edges of the backing sheet they may be compressed in suitable dies to force the flanges 140a and 141a into the backing sheet to clinch the binding strips thereto. At the same time the metal strips may be bent in the dies into bowed or curved shape thereby imparting this shape, see Fig. 7, to the trim panel.

In Figs. 10 and 11 there is illustrated a modified form of fastening means for the trim panel AA. In some instances, particularly in the case of the large panels, it is sometimes desirable to provide an additional pair of fastener devices between the upper and lower corners of the panel. These additional devices, indicated at 60, are carried by the panel as in the preceding embodiment and are preferably located adjacent the upright side edges of the panel at points intermediate the top and bottom edges thereof. The fastener devices 60 are fixed to the outer face of the panel by means of rivets or the like 61. The head portion 60a is embedded in the material of the panel, the intermediate portion 60b projects through the panel, and the free end portion 60c is located on the inner face of the panel and projects downwardly at an angle in spaced relation thereto. The fasteners 70, located in the regions of the upper corners of the panel 30, are similar to the fasteners 60 in that each has a head portion 70a, an angular portion

70b and a downwardly inclined portion 70c located at the inner face of the panel and spaced therefrom, these parts corresponding to the parts 60a, 60b and 60c, respectively of the fastener 60. The fastener 70, however, is provided with an additional downwardly extending portion 70e which is connected with the portion 70c by an angular offset portion 70d. Each of the fasteners 70 is secured to the panel by a rivet 71, or in any other suitable manner, and the head portion 70a thereof are preferably embedded in the material of the panel 30 so as to lie flush with the outer face of the panel providing a smooth surface for the trim fabric 31 when applied to the panel. Adjacent each of its lower corners, the panel is provided with an opening 30a adapted to receive a metal screw 34, the head of which is seated in a metal washer or ferrule 35, the screws 34 serving as the lower fastener devices for removably attaching the trim panel AA to its support BB. The trim panel AA, as shown, is provided at its upright side edges and bottom edge with metal binders D. It will be understood, however, that a metal binder such as the binder C of Fig. 8 may be employed. The support or body member BB is provided at spaced points adjacent the lower corners of the window opening with slots or openings 120 and adjacent each of its lower corners with a hole 121. The support is further provided at intermediate points with slots or openings 122. These slots and openings 120, 121 and 122 are adapted to register and cooperate with the fastener devices or elements carried by the panel AA.

The trim panel AA is provided with the usual trim fabric 31 which covers the outer face thereof. The side and lower edges 31a of the trim fabric are folded over the edges of the backing sheet and the reinforcing binders and glued or cemented to the rear face of the foundation sheet. The upper end of the fabric is left free and may be held in place at the bottom of the window opening in the same manner as shown in Fig. 5. Thus the trim fabric covers and conceals the fasteners 60 and 70.

The trim panel AA is normally held in bowed condition in two directions by the binders C or D and remains in this condition until applied to the support BB. In Fig. 11 a step of the method of assembling the panel with the support is illustrated. The lower portions 70e of the upper fasteners 70 are first inserted through the openings 120 and when hooked over the edges of the openings, as shown, the fasteners 60 will register with the apertures 122 and may be inserted therein without any difficulty. In this manner, therefore, the four fasteners 60 and 70 may be positioned within their respective apertures, as seen in Fig. 11, in substantially one operation. Thereupon the panel is slid downward, hooking the portions 60c and 70c over the edges of the apertures, these portions by their wedging action drawing the upper half of the panel tightly against the face of the door. The outwardly bowed lower half of the panel is then pressed or bent into contact with the face of the door and the metal screws 34 applied to hold the panel in flattened position, as shown in Fig. 10.

While I have illustrated merely two embodiments of binders for the trim panel and two arrangements of fastener devices or elements, it will be understood that various forms of metal binders and other arrangements, members and types of fastener devices may be employed within the scope of the present invention.

I claim:

1. A trim panel adapted to be mounted on a supporting surface comprising a relatively stiff flexible backing sheet having a set bowed condition with edges of the sheet bowed outwardly from the supporting surface before attachment thereto, devices spaced along one of said edges and cooperable to simultaneously hold said edge along a substantial portion of its length bent down tightly against the supporting surface, and means for bending down the remaining portion of said edge tightly against the supporting surface, one of said devices having a preliminary panel holding position to permit predetermined positioning of another fastener device before bending down the edge of the sheet.

2. A trim panel adapted to be mounted on a supporting surface comprising a relatively stiff flexible backing sheet having a set bowed condition with edges of the sheet bowed outwardly from the supporting surface before attachment thereto, devices spaced along one of said edges and cooperable to simultaneously hold said edge along a substantial portion of its length bent down tightly against the supporting surface, and means for bending down the remaining portion of said edge tightly against the supporting surface, one of said devices having a plurality of panel holding positions and another device having a single panel holding position.

3. A trim panel comprising a relatively stiff flexible backing sheet and metallic spring binding means for one or more edges of the sheet and formed before assembly of the panel on a supporting surface to hold the sheet in bent condition bowed outwardly from the supporting surface and adapted to be stressed by bending when the panel is bent down upon such surface to conform to the contour thereof, and spaced devices on the edge of the panel for holding said edge bent down against the supporting surface, one device having a preliminary and a final panel holding position, the preliminary holding position of the device permitting predetermined positioning of another device.

4. A trim panel for attachment to a supporting surface of a vehicle body comprising a relatively stiff flexible backing sheet having a set bowed condition with edges of the sheet bowed outwardly from said surface before attachment thereto, and means for attaching opposite ends of the sheet and an intermediate portion thereof to the surface by bending said edges down tightly against said surface, said means including a plurality of fastening devices, one device having a preliminary and a final panel holding position, the preliminary holding position of the device permitting predetermined positioning of another device.

5. A trim panel for attachment to a supporting surface of a vehicle body comprising a relatively stiff flexible backing sheet having a set bowed condition with edges of the sheet bowed outwardly from said surface before attachment thereto, and means for attaching opposite ends of the sheet and an intermediate portion thereof to the surface by bending said edges down tightly against said surface, said means including a plurality of fastener devices, one device having a plurality of panel holding positions and another device having a single panel holding position.

ALBERT P. BALL.